United States Patent
Shen et al.

(10) Patent No.: US 9,965,880 B2
(45) Date of Patent: May 8, 2018

(54) PICTURE PROCESSING METHOD AND APPARATUS

(71) Applicant: TENCENT TECHNOLOGY (SHENZHEN) COMPANY LIMITED, Shenzhen, Guangdong (CN)

(72) Inventors: Keyi Shen, Shenzhen (CN); Yunsheng Wu, Shenzhen (CN); Bin Fu, Shenzhen (CN); Mengxi Wang, Shenzhen (CN); Feng Shi, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 9 days.

(21) Appl. No.: 15/169,102

(22) Filed: May 31, 2016

(65) Prior Publication Data

US 2016/0275711 A1   Sep. 22, 2016

Related U.S. Application Data

(63) Continuation of application No. PCT/CN2015/082338, filed on Jun. 25, 2015.

(30) Foreign Application Priority Data

Jun. 27, 2014 (CN) .......................... 2014 1 0301216

(51) Int. Cl.
*G06K 9/00* (2006.01)
*G06T 11/60* (2006.01)
(Continued)

(52) U.S. Cl.
CPC ............ *G06T 11/60* (2013.01); *G06K 9/6202* (2013.01); *G06K 9/6215* (2013.01); *G06T 7/337* (2017.01);
(Continued)

(58) Field of Classification Search
CPC ....... G06T 11/60; G06T 7/001; G06K 9/6202; G06K 9/6407; G06K 9/6215; G06K 9/686; G06K 9/6423; G06K 9/32; G06K 2209/27
See application file for complete search history.

(56) References Cited

U.S. PATENT DOCUMENTS 9,626,384 B2 * 4/2017 Carceroni ............ G06F 17/3028
2008/0275881 A1 * 11/2008 Conn ................ G06F 17/30056
(Continued)

FOREIGN PATENT DOCUMENTS

CN    1816100 A    8/2006
CN    103413270 A    11/2013
(Continued)

OTHER PUBLICATIONS

International Search Report in international application No. PCT/CN2015/082338, dated Sep. 18, 2015.
(Continued)

*Primary Examiner* — Amir Alavi
(74) *Attorney, Agent, or Firm* — Oblon, McClelland, Maier & Neustadt, L.L.P.

(57) ABSTRACT

A picture processing method and apparatus are described. The method includes: detecting newly-added pictures in a photo album in a computing device; acquiring information about the newly-added pictures, the information including either or both of a photographing time and a photographing place; updating a to-be-processed picture set according to the information about the newly-added pictures; selecting a picture processing template matching the to-be-processed picture set; and processing pictures in the to-be-processed picture set by using the picture processing template. The method can automatically process a newly-added picture, thereby reducing time costs of a user for picture processing.

18 Claims, 4 Drawing Sheets

(51) Int. Cl.
G06K 9/62 (2006.01)
G06T 7/33 (2017.01)

(52) U.S. Cl.
CPC ...... *G06K 2209/27* (2013.01); *G06T 2200/32* (2013.01); *G06T 2207/10016* (2013.01)

(56) References Cited

U.S. PATENT DOCUMENTS

| | | | |
|---|---|---|---|
| 2009/0319577 A1* | 12/2009 | Obasanjo | G06Q 10/10 |
| 2010/0061636 A1* | 3/2010 | Fukushima | G06K 9/00261 |
| | | | 382/190 |
| 2012/0281752 A1* | 11/2012 | Zheng | H04N 19/105 |
| | | | 375/240.03 |
| 2013/0021368 A1* | 1/2013 | Lee | H04N 1/00153 |
| | | | 345/619 |
| 2015/0331549 A1* | 11/2015 | Legris | G06T 11/206 |
| | | | 715/798 |
| 2016/0259497 A1* | 9/2016 | Foss | G06F 3/0482 |
| 2016/0275711 A1* | 9/2016 | Shen | G06K 9/6202 |

FOREIGN PATENT DOCUMENTS

| | | |
|---|---|---|
| CN | 103679204 A | 3/2014 |
| JP | 2001283186 A | 10/2001 |

OTHER PUBLICATIONS

English Translation of the Written Opinion of the International Search Authority in international application No. PCT/CN2015/082338, dated Sep. 18, 2015.

\* cited by examiner

PICTURE PROCESSING METHOD AND APPARATUS

CROSS REFERENCE TO RELATED APPLICATIONS

This is a continuation application of International Patent Application No. PCT/CN2015/082338, filed on Jun. 25, 2015, which claims priority to Chinese Patent Application No. 201410301216.1, filed on Jun. 27, 2014, the disclosures of which are hereby incorporated by reference in their entirety.

FIELD OF THE TECHNOLOGY

The present disclosure relates to the field of picture processing technologies, and in particular, to a picture processing method and apparatus.

BACKGROUND OF THE DISCLOSURE

At present, with the popularization of digital cameras, mobile phones, cameras, and the like, users take more photos and have more needs regarding photos. They not only have a simple need for recording as in the past, but also hope to embellish a photo or make a photo interesting through processing.

In order to meet such needs of users, some manners for processing a picture according to a choice of a user, such as some picture splicing applications, appear at present. However, traditional picture splicing applications all require that a user manually selects several pictures, selects a template for processing these pictures, and then processes these pictures by using the template to obtain one picture. It can be seen that a defect of such traditional picture processing methods lies in that a user needs to manually select pictures so that an entire picture selection operation often requires a long process and results in high time costs of the user.

SUMMARY

The present disclosure provides a picture processing method, which can automatically process a newly-added picture and reduce time costs of a user for picture processing.

The present disclosure further provides a picture processing apparatus, which can automatically process a newly-added picture and reduce time costs of a user for picture processing.

In one aspect, embodiment of the present application provides a picture processing method. The method runs in a computing device. The computing device may include a memory, one or more processors, and program instructions stored in the memory and executed by the one or more processors. The method includes: detecting at least one newly-added picture in a photo album in the computing device; acquiring information about the at least one newly-added picture, the information comprising either or both of a photographing time and a photographing place; updating a to-be-processed picture set according to the information about the at least one newly-added picture; selecting a picture processing template matching the to-be-processed picture set; and processing pictures in the to-be-processed picture set by using the picture processing template.

A picture processing apparatus, including: a memory; one or more processors; and one or more program modules, stored in the memory and executed by the one or more processors. The one or more program modules include: a to-be-processed picture set determining module, configured to detect at least one newly-added picture in a photo album in the computing device, acquire information about the at least one newly-added picture, and update a to-be-processed picture set according to the information about the at least one newly-added picture, the information comprising either or both of a photographing time and a photographing place; an automatic template selection module, configured to select a picture processing template matching the to-be-processed picture set; and a picture processing module, configured to process pictures in the to-be-processed picture set by using the picture processing template.

A non-transitory computer readable storage medium having stored therein one or more instructions, which, when executed by a computing device, cause the computing device to: detect at least one newly-added picture in a photo album in the computing device; acquire information about the at least one newly-added picture, the information comprising either or both of a photographing time and a photographing place; update a to-be-processed picture set according to the information about the at least one newly-added picture; select a picture processing template matching the to-be-processed picture set; and process pictures in the to-be-processed picture set by using the picture processing template.

It can be seen that the picture processing method and apparatus provided by the present disclosure can automatically select a to-be-processed picture according to a photographing time, a photographing place, or other information of a newly-added picture, and select a picture processing template, so as to process the selected picture by using the picture processing template.

DESCRIPTION OF EMBODIMENTS

Figure 1:
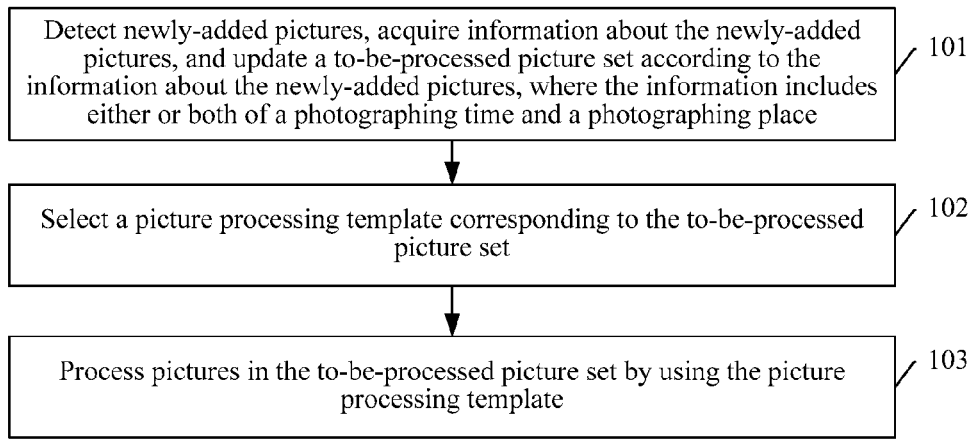
FIG. 1 is a flowchart of implementation of a picture processing method according to the present disclosure.

An embodiment of the present invention provides a picture processing method. FIG. 1 is a flowchart of implementation of the method. The method includes:

Step 101: Detect newly-added pictures in a photo album, acquire information about the newly-added pictures, and update a to-be-processed picture set according to the information about the newly-added pictures, where the information includes either or both of a photographing time and a photographing place.

Step 102: Select a picture processing template matching the to-be-processed picture set.

Step 103: Process pictures in the to-be-processed picture set by using the picture processing template.

The method may further include: presetting a to-be-processed picture set X and a candidate to-be-processed picture set Y, and setting both the to-be-processed picture set X and the candidate to-be-processed picture set Y to empty sets. The to-be-processed picture set X is a picture set automatically provided for a user in the present disclosure, and when a user triggers the picture processing method in the present disclosure, pictures in the to-be-processed picture set X are processed. The candidate to-be-processed picture set Y is a picture set used to assist generation of the to-be-processed picture set X, and a candidate picture which may replace a picture in the to-be-processed picture set X is stored in the set.

When the to-be-processed picture set X and the candidate to-be-processed picture set Y are applied, a manner for updating the to-be-processed picture set to-be-processed picture set X according to the information about the newly-added pictures in step 101 may be:

arranging the newly-added pictures according to a reverse chronological sequence of photographing times, and performing the following steps for each newly-added picture:

determining whether both the to-be-processed picture set X and the candidate to-be-processed picture set Y are empty sets; and adding the newly-added picture to the candidate to-be-processed picture set Y if yes; or determining whether the candidate to-be-processed picture set Y is empty if not; and calculating a difference between the newly-added picture and the to-be-processed picture set X if the candidate to-be-processed picture set Y is empty, determining whether the difference is less than a first preset threshold, and adding the newly-added picture to the to-be-processed picture set X if the difference is less than the first preset threshold, or adding the newly-added picture to the candidate to-be-processed picture set Y if the difference is not less than the first preset threshold; or calculating a difference between the newly-added picture and the candidate to-be-processed picture set Y if the candidate to-be-processed picture set Y is not empty, determining whether the difference is less than a second preset threshold, and adding the newly-added picture to the candidate to-be-processed picture set Y if the difference is less than the second preset threshold, covering pictures in the to-be-processed picture set X with pictures in the candidate to-be-processed picture set Y when a quantity of the pictures in the candidate to-be-processed picture set Y reaches a preset quantitative upper limit, and emptying the candidate to-be-processed picture set Y, or emptying the candidate to-be-processed picture set Y if the difference is not less than the second preset threshold, and adding the newly-added picture to the candidate to-be-processed picture set Y; and further emptying the to-be-processed picture set X and the candidate to-be-processed picture set Y after step 103.

In the foregoing process, a manner for calculating the difference between the newly-added picture and the to-be-processed picture set X may be:

using a photographing time of a latest picture or an average value of photographing times of all pictures in the to-be-processed picture set X as a photographing time of the to-be-processed picture set X, and using an interval between a photographing time of the newly-added picture and the photographing time of the to-be-processed picture set X as the difference between the newly-added picture and the to-be-processed picture set X;

or using a photographing place of a latest picture or a central point of photographing places of all pictures in the to-be-processed picture set X as a photographing place of the to-be-processed picture set X, and using an interval between a photographing place of the newly-added picture and the photographing place of the to-be-processed picture set X as the difference between the newly-added picture and the to-be-processed picture set X;

multiplying an interval between a photographing time of the newly-added picture and a photographing time of the to-be-processed picture set X by a corresponding preset weight to obtain a product, multiplying an interval between a photographing place of the newly-added picture and a photographing place of the to-be-processed picture set X by a corresponding preset weight to obtain a product, and using a sum of the two products as the difference between the newly-added picture and the to-be-processed picture set X.

A manner for calculating the difference between the newly-added picture and the candidate to-be-processed picture set Y is the same as the manner for calculating the difference between the newly-added picture and the to-be-processed picture set X.

In step 101, the newly-added pictures may be local newly-added pictures or online newly-added pictures of a same account, that is, newly-added pictures in another apparatus using the same account. For example, a user uses a same account to log into a related system of the present disclosure on a mobile phone and a tablet computer; in this case, for the mobile phone, a newly-added picture in the tablet computer is an online newly-added picture of a same account.

A specific manner for step 102 may be:

using a preset picture processing template as the picture processing template corresponding to the to-be-processed picture set;

or calculating, according to information about the pictures in the to-be-processed picture set and matching conditions of picture processing templates, degrees to which the picture processing templates match the to-be-processed picture set, and using a picture processing template having a highest matching degree as the picture processing template corresponding to the to-be-processed picture set.

Steps 101 and 102 may be periodically triggered by a timer, and step 103 may be triggered by an instruction of a user.

The following introduces specific embodiments in detail.

Figure 2:
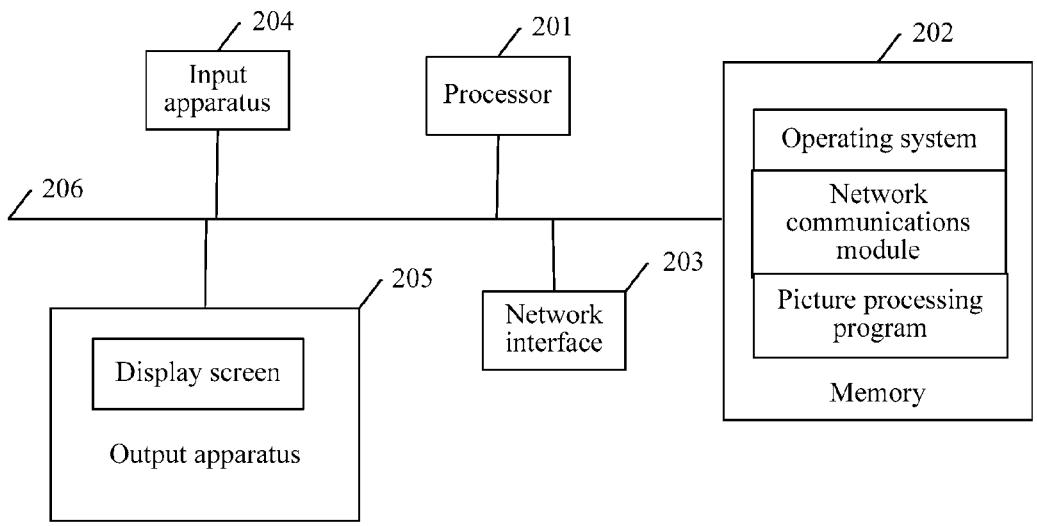
FIG. 2 is a schematic diagram of an architecture of a hardware running environment involved in an embodiment of the present invention.

FIG. 2 is a schematic diagram of an architecture of a hardware running environment involved in an embodiment of the present invention. The architecture of the hardware running environment at least includes:

at least one processor 201, at least one memory 202, at least one network interface 203, at least one input apparatus 204 (such as a mouse and a keyboard), at least one output apparatus 205 (such as a display screen), and at least one communications bus 206, where 201, 202, 203, 204, and 205 may be installed in a computing device.

The network interface 203 may include a standard wired interface or wireless interface (such as a Wi-Fi interface) or the like.

The communications bus 206 is configured to implement connection and communication between these components.

The memory 202 may be a high speed RAM memory, or may be a non-volatile memory, for example, at least one disk memory. The memory 202 may also optionally be at least one storage device located far away from the processor 201. As shown in FIG. 2, the memory 202, as a computer storage medium, may include an operating system, a network communications module, and a picture processing program.

In the hardware environment shown in FIG. 2, the processor 201 may receive a local newly-added picture by using the input apparatus 204, or directly extract a local newly-added picture stored in the memory 202, or detect an online newly-added picture of a same account by using the network interface, and then invoke the picture processing program stored in the memory 202 to execute the picture processing method in the present disclosure; and after processing is completed, the processor 201 may send, by using the communications bus 206, a processed image to a display screen for display.

A Person of ordinary skill in the art may understand that, all or a part of processes in the method may be accomplished by relevant hardware under instructions of a computer program. The program may be stored in a computer-readable storage medium. When the program is executed, the processes of the method may be performed. The storage medium may be a magnetic disk, an optical disk, a Read-Only Memory (ROM), a Random Access Memory (RAM), and the like.

Embodiment 1

Figure 3:
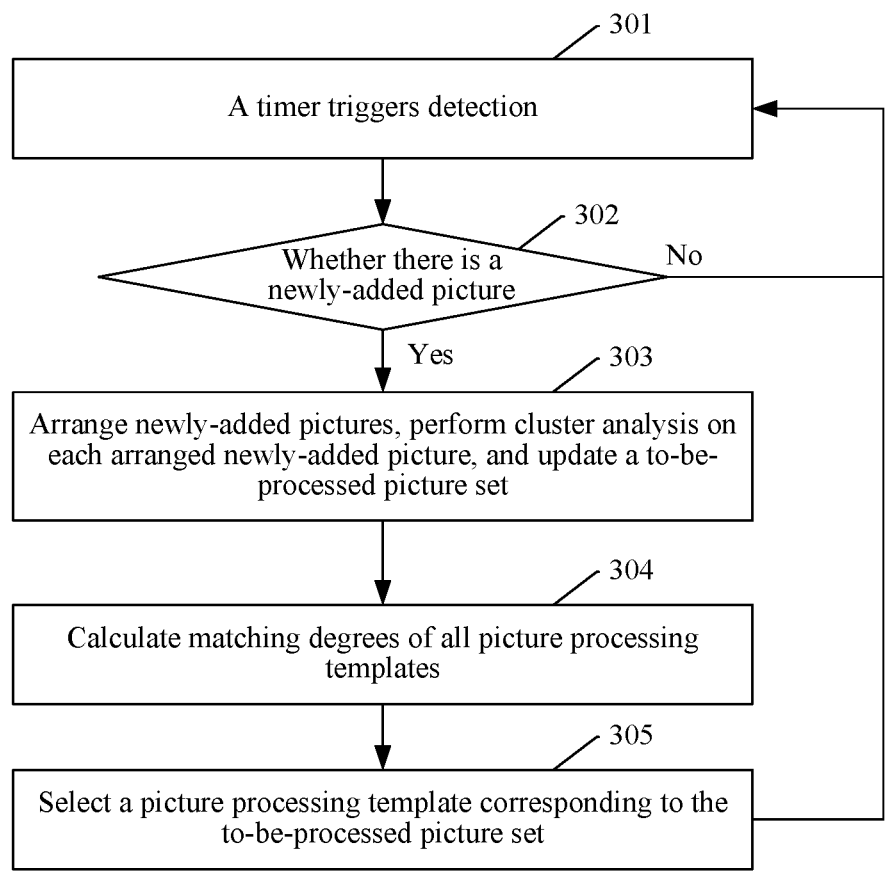
FIG. 3 is a flowchart of implementation of Embodiment 1 of the present invention.

This embodiment introduces a specific example of automatic selection of a to-be-processed picture set and a corresponding picture processing template. As shown FIG. 3, this embodiment includes the following steps:

Step 301: A timer triggers detection.

Step 302: Detect whether there are newly-added pictures, which may include local newly-added pictures or online newly-added pictures of a same account; and if there are newly-added pictures, continue to perform step 303; otherwise, end this operation, and wait until the timer triggers detection next time.

Step 303: Acquire photographing times, photographing places, or other information about the newly-added pictures, arrange the newly-added pictures according to a reverse chronological sequence of the photographing times, perform cluster analysis on each arranged newly-added picture, and update a to-be-processed picture set. A specific manner for cluster analysis is introduced alone in the following. It should be noted that there may be multiple manners for arranging the newly-added pictures, for example, according to a reverse chronological sequence of photographing times.

When taking a picture, a terminal usually records a photographing time and a photographing place, where the photographing time is generally recorded in exchange image file (EXIF) information of the picture. By using this technology, in the present disclosure, a photographing time may be acquired from EXIF information of a picture and a photographing place and other information may be acquired from a memory, so as to be used for sequencing and subsequent selection of a picture processing template.

Step 304: Calculate degrees to which all picture processing templates match the to-be-processed picture set. Calculation of matching degrees of different picture processing templates is defined by respective matching conditions. A matching condition may be represented in a form of a matching function. For example, input of the matching function is photographing information, which is mainly a photographing time, a photographing place, or other information, of each picture in a picture processing template, and output of the matching function is a matching degree, which is value within an interval [0,1].

Step 305: Use a picture processing template having a highest matching degree as a picture processing template corresponding to the to-be-processed picture set, end this operation, and wait until the timer triggers detection next time.

Figure 4:
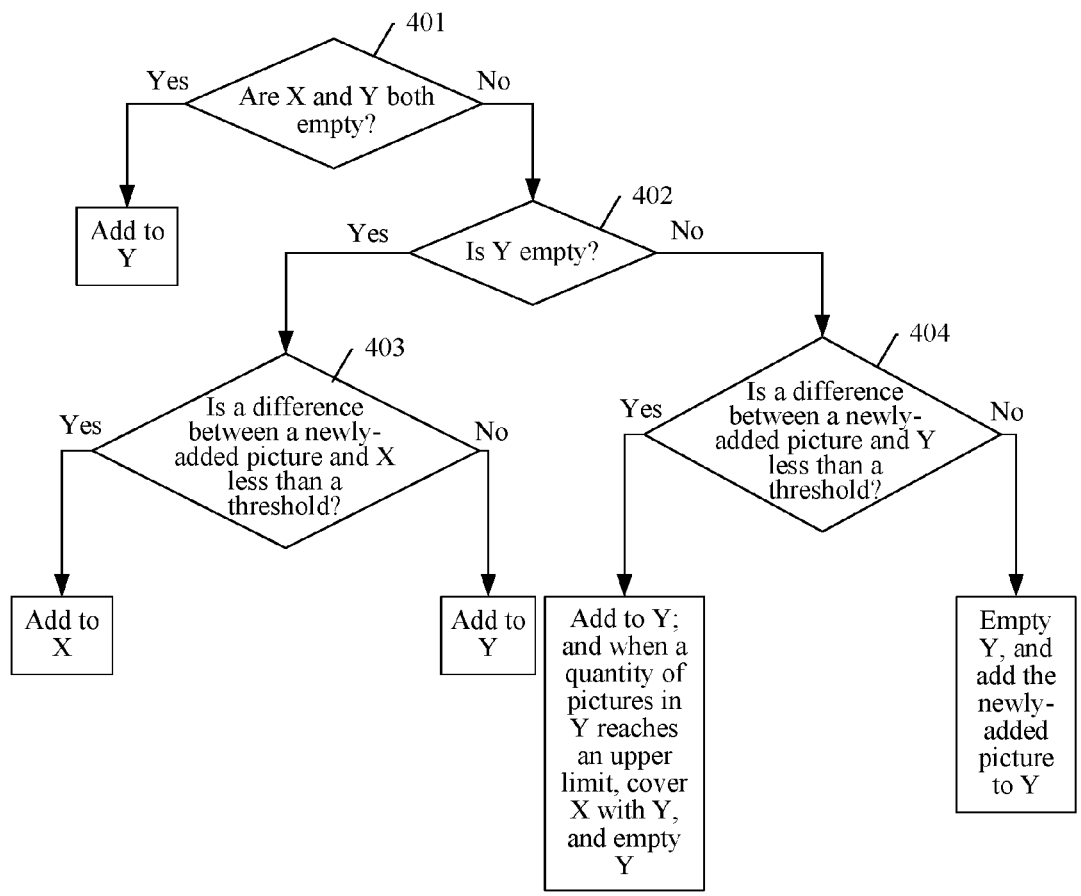
FIG. 4 is a flowchart of implementation of cluster analysis on a single newly-added picture in Embodiment 1 of the present invention.

The following specifically introduces an implementation manner of cluster analysis in step 303. A to-be-processed picture set to-be-processed picture set X and a candidate to-be-processed picture set candidate to-be-processed picture set Y are preset, and the to-be-processed picture set X and the candidate to-be-processed picture set Y are set to empty sets. For a newly-added picture, it is preferably determined whether the newly-added picture can be put into the candidate to-be-processed picture set Y; if the newly-added picture is similar to pictures in the candidate to-be-processed picture set Y, the newly-added picture is put into the candidate to-be-processed picture set Y; if the newly-added picture differs greatly from pictures in the candidate to-be-processed picture set Y, the candidate to-be-processed picture set Y is emptied, and the picture is put into the candidate to-be-processed picture set Y, that is, the candidate to-be-processed picture set Y is reset; and when there are enough pictures in the candidate to-be-processed picture set Y, X is covered by Y, and then Y is emptied and reset. FIG. 4 is a flowchart of implementation of cluster analysis on a single newly-added picture, which includes:

Step 401: Determine whether both the to-be-processed picture set X and the candidate to-be-processed picture set Y are empty sets; and if yes, add the newly-added picture to the candidate to-be-processed picture set Y; or if not, perform step 402.

Step 402: Determine whether the candidate to-be-processed picture set Y is empty; and if yes, perform step 403; otherwise, perform step 404.

Step 403: Calculate a difference between the newly-added picture and the to-be-processed picture set X, and determine whether the difference is less than a first preset threshold; and if the difference is less than the first preset threshold, add the newly-added picture to the to-be-processed picture set X, and end the process; otherwise, add the newly-added picture to the candidate to-be-processed picture set Y, and end the process.

A manner for calculating the difference between the newly-added picture and the to-be-processed picture set X may be:

using a photographing time of a latest picture or an average value of photographing times of all pictures in the to-be-processed picture set X as a photographing time of the to-be-processed picture set X, and using an interval (a unit may be hour) between a photographing time of the newly-added picture and the photographing time of the to-be-processed picture set X as the difference between the newly-added picture and the to-be-processed picture set X;

or using a photographing place of a latest picture or a central point of photographing places of all pictures in the to-be-processed picture set X as a photographing place of the to-be-processed picture set X, and using an interval (a unit may be kilometer) between a photographing place of the newly-added picture and the photographing place of the to-be-processed picture set X as the difference between the newly-added picture and the to-be-processed picture set X;

multiplying an interval between a photographing time of the newly-added picture and a photographing time of the to-be-processed picture set X by a corresponding preset weight to obtain a product, multiplying an interval between a photographing place of the newly-added picture and a photographing place of the to-be-processed picture set X by a corresponding preset weight to obtain a product, and using a sum of the two products as the difference between the newly-added picture and the to-be-processed picture set X, where a simplest manner is that both of the weights are 1 so that the time difference and the distance difference may be directly added together to obtain the difference between the newly-added picture and the to-be-processed picture set X.

Step 404: Calculate a difference between the newly-added picture and the candidate to-be-processed picture set Y, and determine whether the difference is less than a second preset threshold; if the difference is less than the second preset threshold, add the newly-added picture to the candidate to-be-processed picture set Y, and when a quantity of pictures in the candidate to-be-processed picture set Y reaches a preset quantitative upper limit, cover pictures in the to-be-processed picture set X with the pictures in the candidate to-be-processed picture set Y, and empty the candidate to-be-processed picture set Y; or if the difference is not less than the second preset threshold, empty the candidate to-be-processed picture set Y, and add the newly-added picture to the candidate to-be-processed picture set Y.

A manner for calculating the difference between the newly-added picture and the candidate to-be-processed picture set Y is the same as the manner for calculating the difference between the newly-added picture and the to-be-processed picture set X.

Embodiment 2

This embodiment introduces a specific example of selection of a picture processing template.

For a to-be-processed picture set to-be-processed picture set X, a photographing time of a picture included in the to-be-processed picture set to-be-processed picture set X is a meal time, and a photographing place is not a residential place of a user. At present, there are 10 picture processing templates, which are template 1 and template 2 to template 10, and each picture processing template corresponds to a matching function.

A manner for selecting a picture processing template for processing the to-be-processed picture set X is:

using photographing information of the picture in the to-be-processed picture set X as an input value of matching functions corresponding to the picture processing templates, separately calculating output values of the matching functions, and selecting a template having a largest output value as a picture processing template for processing the to-be-processed picture set X.

In this embodiment, template 1 is a picture processing template related to food, and an output value of a matching function thereof is 0.8; template 2 is a picture processing template related to travel, and an output value of a matching function thereof is 0.9; output values of matching functions of the other templates are all less than 0.8; and according to the result, template 2 is selected as a picture processing template for processing the to-be-processed picture set X.

Embodiment 3

Figure 5:
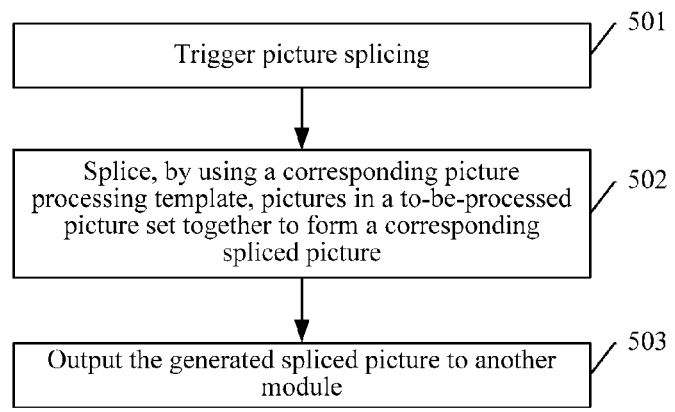
FIG. 5 is a flowchart of implementation of Embodiment 2 of the present invention.

This embodiment introduces a specific example of processing of a to-be-processed picture set by using a corresponding picture processing template (which is referred to picture splicing below). As shown in FIG. 5, this embodiment includes the following steps:

Step 501: Trigger picture splicing. When a user uses a picture splicing function or another function that relies on picture splicing (for example, the user needs to generate a thumbnail of a spliced picture), picture splicing is triggered.

Step 502: Splice, by using a corresponding picture processing template, pictures in a to-be-processed picture set together to form a corresponding spliced picture.

Step 503: Output the generated spliced picture to another module.

Figure 6:
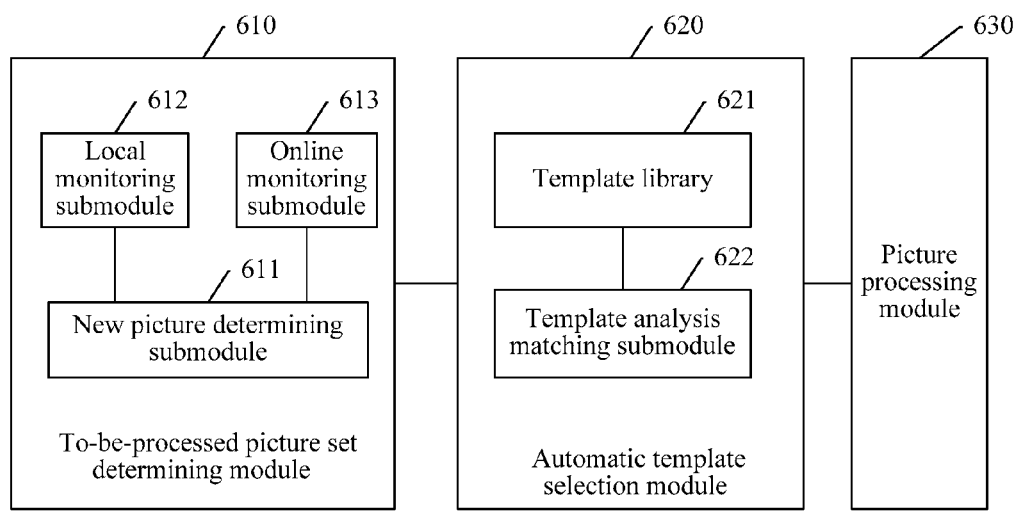
FIG. 6 is a schematic structural diagram of a picture processing apparatus according to the present disclosure.

The present disclosure further provides a picture processing apparatus. FIG. 6 is a schematic structural diagram of the apparatus, which includes:

a to-be-processed picture set determining module 610, configured to detect newly-added pictures, and update a to-be-processed picture set according to information about the newly-added pictures, where the information includes either or both of a photographing time and a photographing place;

an automatic template selection module 620, configured to select a picture processing template corresponding to the to-be-processed picture set; and a picture processing module 630, configured to process pictures in the to-be-processed picture set by using the picture processing template.

The to-be-processed picture set determining module 610 may include a new picture determining submodule 611, configured to set a processed picture set to-be-processed picture set X and a candidate to-be-processed picture set candidate to-be-processed picture set Y, set both the to-be-processed picture set X and the candidate to-be-processed picture set Y to empty sets in an initial state, and empty the to-be-processed picture set X and the candidate to-be-processed picture set Y after the picture processing module processes the pictures in the to-be-processed picture set; and further configured to arrange the newly-added pictures according to a reverse chronological sequence of photographing times, and perform the following steps for each newly-added picture:

determining whether both the to-be-processed picture set X and the candidate to-be-processed picture set Y are empty sets; and adding the newly-added picture to the candidate to-be-processed picture set Y if yes; or determining whether the candidate to-be-processed picture set Y is empty if not; and calculating a difference between the newly-added picture and the to-be-processed picture set X if the candidate to-be-processed picture set Y is empty, determining whether the difference is less than a first preset threshold, and adding the newly-added picture to the to-be-processed picture set X if the difference is less than the first preset threshold, or adding the newly-added picture to the candidate to-be-processed picture set Y if the difference is not less than the first preset threshold; or calculating a difference between the newly-added picture and the candidate to-be-processed picture set Y if the candidate to-be-processed picture set Y is not empty, determining whether the difference is less than a second preset threshold, and adding the newly-added picture to the candidate to-be-processed picture set Y if the difference is less than the second preset threshold, covering pictures in the to-be-processed picture set X with pictures in the candidate to-be-processed picture set Y when a quantity of the pictures in the candidate to-be-processed picture set Y reaches a preset quantitative upper limit, and emptying the candidate to-be-processed picture set Y, or emptying the candidate to-be-processed picture set Y if the difference is not less than the second preset threshold, and adding the newly-added picture to the candidate to-be-processed picture set Y.

In the apparatus, a manner for calculating the difference between the newly-added picture and the to-be-processed picture set X or the candidate to-be-processed picture set Y by the new picture determining submodule 611 may be:

using a photographing time of a latest picture or an average value of photographing times of all pictures in the to-be-processed picture set X or the candidate to-be-processed picture set Y as a photographing time of the to-be-processed picture set X or the candidate to-be-processed picture set Y, and using an interval between a photographing time of the newly-added picture and the photographing time of the to-be-processed picture set X or the candidate to-be-processed picture set Y as the difference between the newly-added picture and the to-be-processed picture set X or the candidate to-be-processed picture set Y;

or using a photographing place of a latest picture or a central point of photographing places of all pictures in the to-be-processed picture set X or the candidate to-be-processed picture set Y as a photographing place of the to-be-processed picture set X or the candidate to-be-processed picture set Y, and using an interval between a photographing place of the newly-added picture and the photographing place of the to-be-processed picture set X or the candidate to-be-processed picture set Y as the difference between the newly-added picture and the to-be-processed picture set X or the candidate to-be-processed picture set Y;

or multiplying an interval between a photographing time of the newly-added picture and a photographing time of the to-be-processed picture set X or the candidate to-be-processed picture set Y by a corresponding preset weight to obtain a product, multiplying an interval between a photographing place of the newly-added picture and a photographing place of the to-be-processed picture set X or the candidate to-be-processed picture set Y by a corresponding preset weight to obtain a product, and using a sum of the two products as the difference between the newly-added picture and the to-be-processed picture set X or the candidate to-be-processed picture set Y.

The to-be-processed picture set determining module 610 may further include:

a local monitoring submodule 612, configured to detect local newly-added pictures; and an online monitoring submodule 613, configured to detect online newly-added pictures of a same account.

In the apparatus, the automatic template selection module 620 may include:

a template library 621, configured to save picture processing templates and matching conditions corresponding to the picture processing templates; and a template analysis matching submodule 622, configured to calculate, according to photographing information about the pictures in the to-be-processed picture set and the matching conditions of the picture processing templates, degrees to which the picture processing templates match the to-be-processed picture set, and use a picture processing template having a highest matching degree as the picture processing template corresponding to the to-be-processed picture set.

It can be seen from the foregoing that the picture processing method and apparatus provided by the present disclosure can automatically select a picture according to a time, a place, or other photographing information of a newly-added picture, select a proper picture processing template, and process the selected picture by using the picture processing template.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A picture processing method, applied to a computing device, the computing device comprising a memory, one or more processors, and a program instruction stored in the memory and executed by the one or more processors, and the method comprising:

detecting at least one newly-added picture in a photo album in the computing device;

acquiring information about the at least one newly-added picture, the information comprising either or both of a photographing time and a photographing place;

performing cluster analysis on each newly-added picture and updating a to-be-processed picture set according to the information about the at least one newly-added picture;

selecting a picture processing template matching the to-be-processed picture set; and processing pictures in the to-be-processed picture set by using the picture processing template, wherein the performing cluster analysis on each newly-added picture comprises:

presetting the to-be-processed picture set X and a candidate to-be-processed picture set Y; if the newly-added picture is similar to pictures in the candidate to-be-processed picture set Y, putting the newly-added picture into the candidate to-be-processed picture set Y; if the newly-added picture differs greatly from pictures in the candidate to-be-processed picture set Y, emptying the candidate to-be-processed picture set Y, and putting the newly-added pictures in the candidate to-be-processed picture set Y; and when there are enough pictures in the candidate to-be-processed picture set Y, covering the to-be-processed picture set X by the candidate to-be-processed picture set Y.

2. The method according to claim 1, wherein the method comprises:

arranging the at least one newly-added picture according to a reverse chronological sequence of photographing times.

3. The method according to claim 2, wherein the performing cluster analysis on each newly-added picture specifically comprises:

presetting the to-be-processed picture set X and the candidate to-be-processed picture set Y, and setting both the to-be-processed picture set X and the candidate to-be-processed picture set Y to empty sets;

performing following steps for each newly-added picture:

determining whether both the to-be-processed picture set X and the candidate to-be-processed picture set Y are empty sets; and adding the newly-added picture to the candidate to-be-processed picture set Y if yes; or determining whether the candidate to-be-processed picture set Y is empty if both the to-be-processed picture set X and the candidate to-be-processed picture set Y are not empty; and calculating a difference between the newly-added picture and the to-be-processed picture set X if the candidate to-be-processed picture set Y is empty, determining whether the difference is less than a first preset threshold, and adding the newly-added picture to the to-be-processed picture set X if the difference is less than the first preset threshold, or adding the newly-added picture to the candidate to-be-processed picture set Y if the difference is not less than the first preset threshold; or calculating a difference between the newly-added picture and the candidate to-be-processed picture set Y if the candidate to-be-processed picture set Y is not empty, determining whether the difference is less than a second preset threshold, and adding the newly-added picture to the candidate to-be-processed picture set Y if the difference is less than the second preset threshold, covering pictures in the to-be-processed picture set X with pictures in the candidate to-be-processed picture set Y when a quantity of the pictures in the candidate to-be-processed picture set Y reaches a preset quantitative upper limit, and emptying the candidate to-be-processed picture set Y, or emptying the candidate to-be-processed picture set Y if the difference is not less than the second preset threshold, and adding the newly-added picture to the candidate to-be-processed picture set Y; and further emptying the to-be-processed picture set X and the candidate to-be-processed picture set Y after the pictures in the to-be-processed picture set are processed.

4. The method according to claim 3, wherein a manner for calculating the difference between the newly-added picture and the to-be-processed picture set X or the candidate to-be-processed picture set Y is:

using a photographing time of a latest picture or an average value of photographing times of all pictures in the to-be-processed picture set X or the candidate to-be-processed picture set Y as a photographing time of the to-be-processed picture set X or the candidate to-be-processed picture set Y, and using an interval between a photographing time of the newly-added picture and the photographing time of the to-be-processed picture set X or the candidate to-be-processed picture set Y as the difference between the newly-added picture and the to-be-processed picture set X or the candidate to-be-processed picture set Y.

5. The method according to claim 3, wherein a manner for calculating the difference between the newly-added picture and the to-be-processed picture set X or the candidate to-be-processed picture set Y is:

using a photographing place of a latest picture or a central point of photographing places of all pictures in the to-be-processed picture set X or the candidate to-be-processed picture set Y as a photographing place of the to-be-processed picture set X or the candidate to-be-processed picture set Y, and using an interval between a photographing place of the newly-added picture and the photographing place of the to-be-processed picture set X or the candidate to-be-processed picture set Y as the difference between the newly-added picture and the to-be-processed picture set X or the candidate to-be-processed picture set Y.

6. The method according to claim 3, wherein a manner for calculating the difference between the newly-added picture and the to-be-processed picture set X or the candidate to-be-processed picture set Y is:

multiplying an interval between a photographing time of the newly-added picture and a photographing time of the to-be-processed picture set X or the candidate to-be-processed picture set Y by a corresponding preset weight to obtain a product, multiplying an interval between a photographing place of the newly-added picture and a photographing place of the to-be-processed picture set X or the candidate to-be-processed picture set Y by a corresponding preset weight to obtain a product, and using a sum of the two products as the difference between the newly-added picture and the to-be-processed picture set X or the candidate to-be-processed picture set Y.

7. The method according to claim 1, wherein a manner for selecting the picture processing template corresponding to the to-be-processed picture set is:

using a preset picture processing template as the picture processing template corresponding to the to-be-processed picture set; or calculating, according to information about the pictures in the to-be-processed picture set and matching conditions of picture processing templates, degrees to which the picture processing templates match the to-be-processed picture set, and using a picture processing template having a highest matching degree as the picture processing template corresponding to the to-be-processed picture set.

8. The method according to claim 1, wherein the at least one newly-added picture is a local newly-added picture or an online newly-added picture of a same account.

9. The method according to claim 1, wherein the detection of the at least one newly-added picture and the selection of a picture processing template corresponding to the to-be-processed picture set are periodically triggered by a timer; and the processing of pictures is triggered by an instruction of a user.

10. A picture processing apparatus, the apparatus comprising:

a memory;

one or more processors; and one or more program modules, stored in the memory and executed by the one or more processors, and the one or more program modules comprising:

a to-be-processed picture set determining module, configured to detect at least one newly-added picture in a photo album in the computing device, acquire information about the at least one newly-added picture, perform cluster analysis on each newly-added picture and update a to-be-processed picture set according to the information about the at least one newly-added picture, the information comprising either or both of a photographing time and a photographing place;

an automatic template selection module, configured to select a picture processing template matching the to-be-processed picture set; and a picture processing module, configured to process pictures in the to-be-processed picture set by using the picture processing template, wherein the to-be-processed picture set determining module comprises a new picture determining sub-module, configured to: preset the to-be-processed picture set X and a candidate to-be-processed picture set Y; if the newly-added picture is similar to pictures in the candidate to-be-processed picture set Y, put the newly-added picture into the candidate to-be-processed picture set Y; if the newly-added picture differs greatly from pictures in the candidate to-be-processed picture set Y, empty the candidate to-be-processed picture set Y, and put the newly-added picture into the candidate to-be-processed picture set Y; and when there are enough pictures in the candidate to-be-processed picture set Y, cover the to-be-processed picture set X by the candidate to-be-processed picture set Y.

11. The apparatus according to claim 10, wherein the to-be-processed picture set determining module is configured to arrange the at least one newly-added picture according to a reverse chronological sequence of photographing times.

12. The apparatus according to claim 11, wherein the new picture determining submodule is further configured to set the processed picture set to-be-processed picture set X and the candidate to-be-processed picture set candidate to-be-processed picture set Y, set both the to-be-processed picture set X and the candidate to-be-processed picture set Y to empty sets in an initial state, and empty the to-be-processed picture set X and the candidate to-be-processed picture set Y after the picture processing module processes the pictures in the to-be-processed picture set; and perform the following steps for each newly-added picture:
  determining whether both the to-be-processed picture set X and the candidate to-be-processed picture set Y are empty sets; and
  adding the newly-added picture to the candidate to-be-processed picture set Y if yes; or
  determining whether the candidate to-be-processed picture set Y is empty if not; and
  calculating a difference between the newly-added picture and the to-be-processed picture set X if the candidate to-be-processed picture set Y is empty, determining whether the difference is less than a first preset threshold, and adding the newly-added picture to the to-be-processed picture set X if the difference is less than the first preset threshold, or adding the newly-added picture to the candidate to-be-processed picture set Y if the difference is not less than the first preset threshold; or
  calculating a difference between the newly-added picture and the candidate to-be-processed picture set Y if the candidate to-be-processed picture set Y is not empty, determining whether the difference is less than a second preset threshold, and adding the newly-added picture to the candidate to-be-processed picture set Y if the difference is less than the second preset threshold, covering pictures in the to-be-processed picture set X with pictures in the candidate to-be-processed picture set Y when a quantity of the pictures in the candidate to-be-processed picture set Y reaches a preset quantitative upper limit, and emptying the candidate to-be-processed picture set Y, or emptying the candidate to-be-processed picture set Y if the difference is not less than the second preset threshold, and adding the newly-added picture to the candidate to-be-processed picture set Y.

13. The apparatus according to claim 12, wherein a manner for calculating the difference between the newly-added picture and the to-be-processed picture set X or the candidate to-be-processed picture set Y by the new picture determining submodule is:

using a photographing time of a latest picture or an average value of photographing times of all pictures in the to-be-processed picture set X or the candidate to-be-processed picture set Y as a photographing time of the to-be-processed picture set X or the candidate to-be-processed picture set Y, and using an interval between a photographing time of the newly-added picture and the photographing time of the to-be-processed picture set X or the candidate to-be-processed picture set Y as the difference between the newly-added picture and the to-be-processed picture set X or the candidate to-be-processed picture set Y.

14. The apparatus according to claim 12, wherein a manner for calculating the difference between the newly-added picture and the to-be-processed picture set X or the candidate to-be-processed picture set Y by the new picture determining submodule is:

using a photographing place of a latest picture or a central point of photographing places of all pictures in the to-be-processed picture set X or the candidate to-be-processed picture set Y as a photographing place of the to-be-processed picture set X or the candidate to-be-processed picture set Y, and using an interval between a photographing place of the newly-added picture and the photographing place of the to-be-processed picture set X or the candidate to-be-processed picture set Y as the difference between the newly-added picture and the to-be-processed picture set X or the candidate to-be-processed picture set Y.

15. The apparatus according to claim 12, wherein a manner for calculating the difference between the newly-added picture and the to-be-processed picture set X or the candidate to-be-processed picture set Y by the new picture determining submodule is:

multiplying an interval between a photographing time of the newly-added picture and a photographing time of the to-be-processed picture set X or the candidate to-be-processed picture set Y by a corresponding preset weight to obtain a product, multiplying an interval between a photographing place of the newly-added picture and a photographing place of the to-be-processed picture set X or the candidate to-be-processed picture set Y by a corresponding preset weight to obtain a product, and using a sum of the two products as the difference between the newly-added picture and the to-be-processed picture set X or the candidate to-be-processed picture set Y.

16. The apparatus according to claim 12, wherein the to-be-processed picture set determining module further comprises:
  a local monitoring submodule, configured to detect local newly-added pictures; and
  an online monitoring submodule, configured to detect online newly-added pictures of a same account.

17. The apparatus according to claim 10, wherein the automatic template selection module comprises:
  a template library, configured to save picture processing templates and matching conditions corresponding to the picture processing templates; and
  a template analysis matching submodule, configured to calculate, according to information about the pictures in the to-be-processed picture set and the matching conditions of the picture processing templates, degrees to which the picture processing templates match the to-be-processed picture set, and use a picture processing template having a highest matching degree as the picture processing template corresponding to the to-be-processed picture set.

18. A non-transitory computer readable storage medium having stored therein one or more instructions, which, when executed by a computing device, cause the computing device to:
  detect at least one newly-added picture in a photo album in the computing device;
  acquire information about the at least one newly-added picture, the information comprising either or both of a photographing time and a photographing place;

perform cluster analysis ion each newly-added picture and update a to-be-processed picture set according to the information about the at least one newly-added picture;
select a picture processing template matching the to-be-processed picture set; and
process pictures in the to-be-processed picture set by using the picture processing template,
cause the computing device further to:
preset the to-be-processed picture set X and a candidate to-be-processed picture set Y; if the newly-added picture is similar to pictures in the candidate to-be-processed picture set Y, put the newly-added picture into the candidate to-be-processed picture set Y; if the newly-added picture differs greatly from pictures in the candidate to-be-processed picture set Y, empty the candidate to-be-processed picture set Y, and put the newly-added picture into the candidate to-be-processed picture set Y, and when there are enough pictures in the candidate to-be-processed picture set Y, cover the to-be-processed picture set X by the candidate to-be-processed picture set Y.

* * * * *